J. J. DAVIS, Sr.
SPRING VEHICLE WHEEL.
APPLICATION FILED SEPT. 23, 1913.

1,115,178.

Patented Oct. 27, 1914.
2 SHEETS—SHEET 1.

Witnesses
Wm H. Mulligan
C. H. Crawford

Inventor
James Jeffery Davis, Sr.

By
Richard Bowen
Attorney

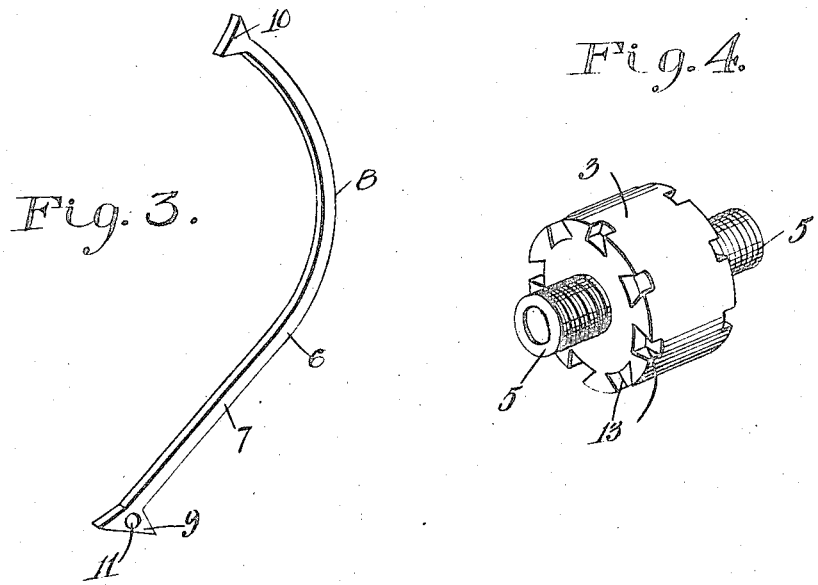
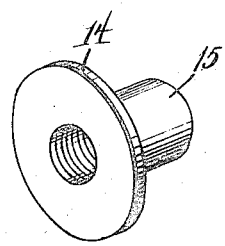

UNITED STATES PATENT OFFICE.

JAMES JEFFERY DAVIS, SR., OF ST. MARYS, MISSOURI.

SPRING VEHICLE-WHEEL.

1,115,178. Specification of Letters Patent. Patented Oct. 27, 1914.

Application filed September 23, 1913. Serial No. 791,366.

*To all whom it may concern:*

Be it known that I, JAMES JEFFERY DAVIS, Sr., a citizen of the United States, residing at St. Marys, in the county of St. Genevieve and State of Missouri, have invented certain new and useful Improvements in Spring Vehicle-Wheels, of which the following is a specification.

This invention relates to improvements in spring wheels principally for use in connection with road vehicles and having for its principal object the avoidance of pneumatic tires.

One of the objects of the invention is to connect the hub and felly of a wheel with spring spokes which are formed and connected so as to yieldingly neutralize the jolts and jars which are usually transmitted to a vehicle and its parts.

A further object of the invention consists in providing hub and felly connections for the spokes so as to afford a structural locking engagement thereof by the co-acting structural parts comprising portions of the spoke and hub, and also the spokes and felly, so that the strain imposed will not be on the attaching means for retaining the spokes in place.

Further objects and novel features of the invention will be more fully described in connection with the accompanying drawings and will be more particularly pointed out in and by the appended claim.

Figure 1:
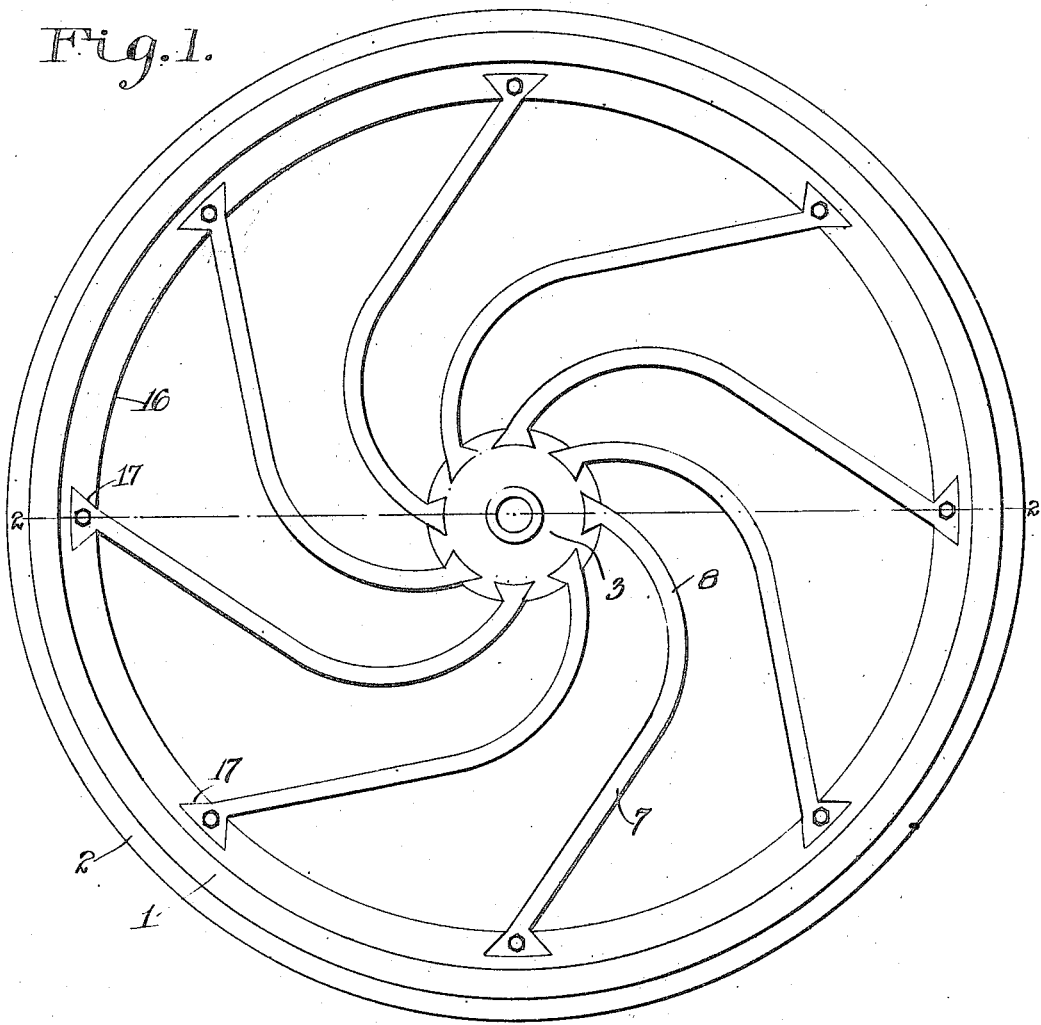
Figure 2:
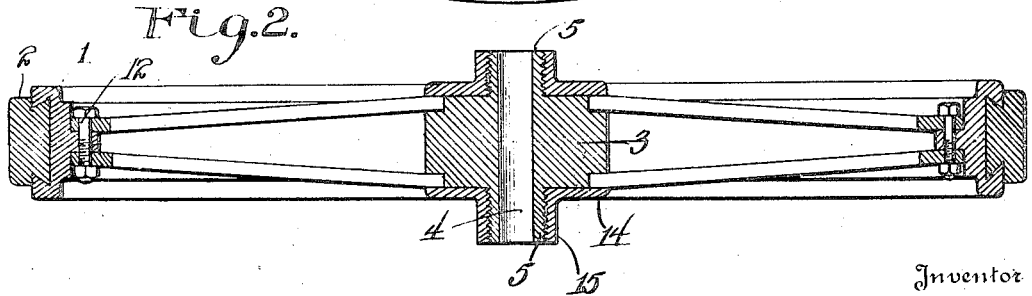

In the drawings: Figure 1, is a view in side elevation of a spring vehicle wheel embodying one form of my invention. Fig. 2, is a sectional view thereof on line 2—2 of Fig. 1. Fig. 3, is a detail perspective view of one of the spokes detached from the wheel. Fig. 4, is a detached perspective view of the hub. Fig. 5, is a detached perspective view of a retaining member for holding the spokes in a structurally locked position.

Like characters of reference designate similar parts throughout the different figures of the drawings.

As illustrated, 1, designates a felly which may be provided with any form of tread such as a solid rubber tire herein shown, and designated at 2. A hub is indicated at 3, and is provided with a bore 4, to receive an axle. The hub 3, is provided with exteriorly threaded extensions 5, which project outwardly from the body of the hub 3, and which performs a function which will presently appear.

The hub and felly are connected by a plurality of sets of spokes, each of which is formed of spring strip material, and one thereof being indicated as a whole at 6, in Fig. 3. As will be seen more fully by reference to Fig. 1, the spokes have outer straight portions 7, which are disposed at an angle to the radial, and inner curved portions 8, which join the spokes with the hub at points rearwardly of a radial line intersecting junctures of the spokes with the felly. Each of the spokes is provided with locking ends which are enlarged with respect to the body portion of the said spokes and which are shown in the form of dovetails. As illustrated in Fig. 3, the spoke 6, is provided with a felly dovetail 9 and a hub dovetail 10. The felly dovetail 9, is provided with an opening 11, for passage therethrough of an attaching device which may be in the form of a bolt, as indicated at 12.

As will be seen by reference to Fig. 2, a set of spokes is provided for attachment on opposite sides of the hub and felly and the former, as indicated in Fig. 4, is provided on the opposite ends with a set of dovetailed notches 13, of a sufficient depth to permit of the dovetail ends 10, being inserted therein, so as to lie flush with the outer faces of the hub. Retaining means is provided which may consist of rings 14, adapted to lie flat against the ends of the hub 3, to retain the spoke ends in the hub notches. The rings 14, may be provided with internally threaded extensions 15, for threaded engagement with the extensions 5, of the hub 3, so that when the rings are turned into place, as shown in Fig. 2, the hub ends of the spokes will be retained in a manner to structurally lock them with the hub. Thus it will be seen that reliance is merely placed upon the rings 14, functioning to retain the spokes in structurally locked engagement with the hubs.

The felly 1, is provided with a flange 16, having on its opposite faces a plurality of dovetailed notches for receiving the dovetail ends 9, of the spokes. In the present embodiment of the invention, the retaining means for the felly ends of the spokes consists of the bolts 12, which serve to hold the dovetail spoke ends 9, in structural locked engagement with the dovetailed notches 17.

The spokes will be made of the best steel spring and they will be of sufficient cross section to support the wheel against any tendency to dish, and in this connection, I preferably space the hub ends of the spokes apart a relatively considerable distance so that any tendency of the wheel to dish would be effectively resisted.

It is believed that the advantages and utility of my invention will be clear from the foregoing and while I have herein shown and described one specific form of my invention I do not wish to be limited thereto except for such limitations as the claim may import.

I claim:

A wheel comprising a felly having a plurality of sockets on both side faces thereof, a hub having a plurality of sockets on both side faces thereof, spring spokes having their ends positioned in the sockets of said felly and said hub, means passing through said felly and the ends of said spokes in said felly for retaining the same therein and plates threaded on both side faces of said hub for retaining said ends of said spokes positioned therein.

In testimony whereof I affix my signature in presence of two witnesses.

JAMES JEFFERY DAVIS, Sr.

Witnesses:
AGATHA THOMURE,
LOUIS E. SCHOOFF.

---

Copies of this patent may be obtained for five cents each, by addressing the "Commissioner of Patents, Washington, D. C."